(12) United States Patent
Brophy et al.

(10) Patent No.: US 12,019,413 B2
(45) Date of Patent: Jun. 25, 2024

(54) SYSTEM AND METHOD FOR POWER ARBITRATION OF DEVICES CONNECTED TO A BUS

(71) Applicant: Johnson Controls Tyco IP Holdings LLP, Milwaukee, WI (US)

(72) Inventors: Christopher P. Brophy, Cedarburg, WI (US); Kraig D. Ritmanich, Brookfield, WI (US); Mark G. Freund, Wauwatosa, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 64 days.

(21) Appl. No.: 17/403,586

(22) Filed: Aug. 16, 2021

(65) Prior Publication Data

US 2022/0050430 A1 Feb. 17, 2022

Related U.S. Application Data

(60) Provisional application No. 63/066,404, filed on Aug. 17, 2020.

(51) Int. Cl.
*G06F 1/3234* (2019.01)
*G05B 15/02* (2006.01)
*G06F 13/20* (2006.01)

(52) U.S. Cl.
CPC ........... *G05B 15/02* (2013.01); *G06F 1/3253* (2013.01); *G06F 13/20* (2013.01); *G05B 2219/25011* (2013.01); *G05B 2219/2639* (2013.01)

(58) Field of Classification Search
USPC ........................................................ 700/275
See application file for complete search history.

(56) References Cited

U.S. PATENT DOCUMENTS

| | | | | |
|---|---|---|---|---|
| 5,483,656 A * | 1/1996 | Oprescu | ................ | G06F 1/3253 700/297 |
| 10,437,761 B2 | 10/2019 | Chen | | |
| 10,976,798 B2 * | 4/2021 | Basterash | ............ | H02J 7/0042 |
| 2005/0055585 A1 * | 3/2005 | Maier | ..................... | H04L 12/10 713/300 |
| 2014/0208140 A1 * | 7/2014 | Brooks | ................. | G06F 1/3209 713/340 |
| 2016/0104363 A1 * | 4/2016 | Dorfstatter | ............... | H04N 7/18 348/143 |

* cited by examiner

*Primary Examiner* — Emilio J Saavedra
(74) *Attorney, Agent, or Firm* — Foley & Lardner LLP

(57) ABSTRACT

A controller for controlling power consumption of devices within a building management system (BMS) is shown. The controller includes a processing circuit configured to determine, via a plurality of devices, an active device. The processing circuit is further configured to determine a power consumption of the active device using at least one of an address of the active device or an attribute from a device object associated with the active device. The processing circuit is further configured to compute a total power consumption value of one or more active devices of the plurality of devices, the one or more active devices comprising the active device. The processing circuit is further configured to compare the total power consumption value with a threshold value and, in response to determining that the total power consumption value is greater than the threshold value, arbitrating the power supplied from the bus to the active device.

18 Claims, 9 Drawing Sheets

513-1

| SA Bus Device | SA Bus Power Consumption (mA) | Address Range |
|---|---|---|
| Discharge Air Sensors | 12 | 199-203 |
| Balancing Sensors | 25 | 1-3 |
| Network Sensors w/o display | 13 | 199-203 |
| Network Sensors w/ display, w/o RH | 21 | 199-203 |
| Network Sensors w/ display, w/ RH | 27 | 199-203 |
| CO2 Nework Sensors | 28 non-iso (or 5 iso) | 199-203 |
| ZFR1811 Wireless Field Bus Router | 90 | 120-127 |
| ZFR1812 Wireless Field Bus Router | 90 | 120-127 |
| DIS1710 Local Controller Display | 90 | 1-3 |
| Wireless Commissioning Converter | 90 | 1-3 |
| Variable Speed Drives | N/A | 128-254 |
| IOM Series Controllers | N/A | 128-254 |
| Romutec Modules | N/A | 128-254 |

FIG. 5B

SYSTEM AND METHOD FOR POWER ARBITRATION OF DEVICES CONNECTED TO A BUS

CROSS-REFERENCE TO RELATED APPLICATION

This application claims the benefit of and priority to U.S. Patent Application No. 63/066,404 filed Aug. 17, 2020, the entire disclosure of which is incorporated by reference in its entirety.

BACKGROUND

Electric power is used as an energy source in majority of devices and processes present at household activities and all commercial buildings. Building management systems (BMS) may use electric power to boot-up some or all of the devices present in the BMS at a low power level. BMS devices may further consume more electric power for full power operation of one or more of a plurality of BMS devices. The BMS may include an operational management sub-system for information processing, energy management sub-system for creating a hassle-free power distribution grid, and other sub-systems.

In some embodiments, there are many instances, in the power management subsystem of the BMS, where power consumed by the BMS device is more than the actual power required by the device to remain active and perform its required functions. There can be situations when one or more BMS devices periodically draw power irrespective of their requirement. For example, BMS devices positioned within a conference room continue to operate even when the conference room is unoccupied, which is not desired. Similar cases occur for other BMS devices positioned at different locations in the building. The consumption of power by BMS devices through the bus is an important factor. In some instances, there is a need for periodic monitoring of the power consumption of the BMS devices.

BMS devices are enabled to communicate and receive power from a bus. Every bus is capable of supplying power up to a pre-defined value. A situation may arise when the BMS devices draw power which is more than the pre-defined value. Such situation may lead the bus to supply power more than the power supply capacity of the bus. When power supplied through the bus exceeds the pre-defined value, damages/failures may occur to/within the bus due to reasons such as short-circuiting or overheating.

Therefore, it is desirable to have an efficient and dynamic power arbitration system.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 5B is a data table showing data belonging to a list of slave devices with the naming terminology, according to some embodiments.

SUMMARY

Figure 1:
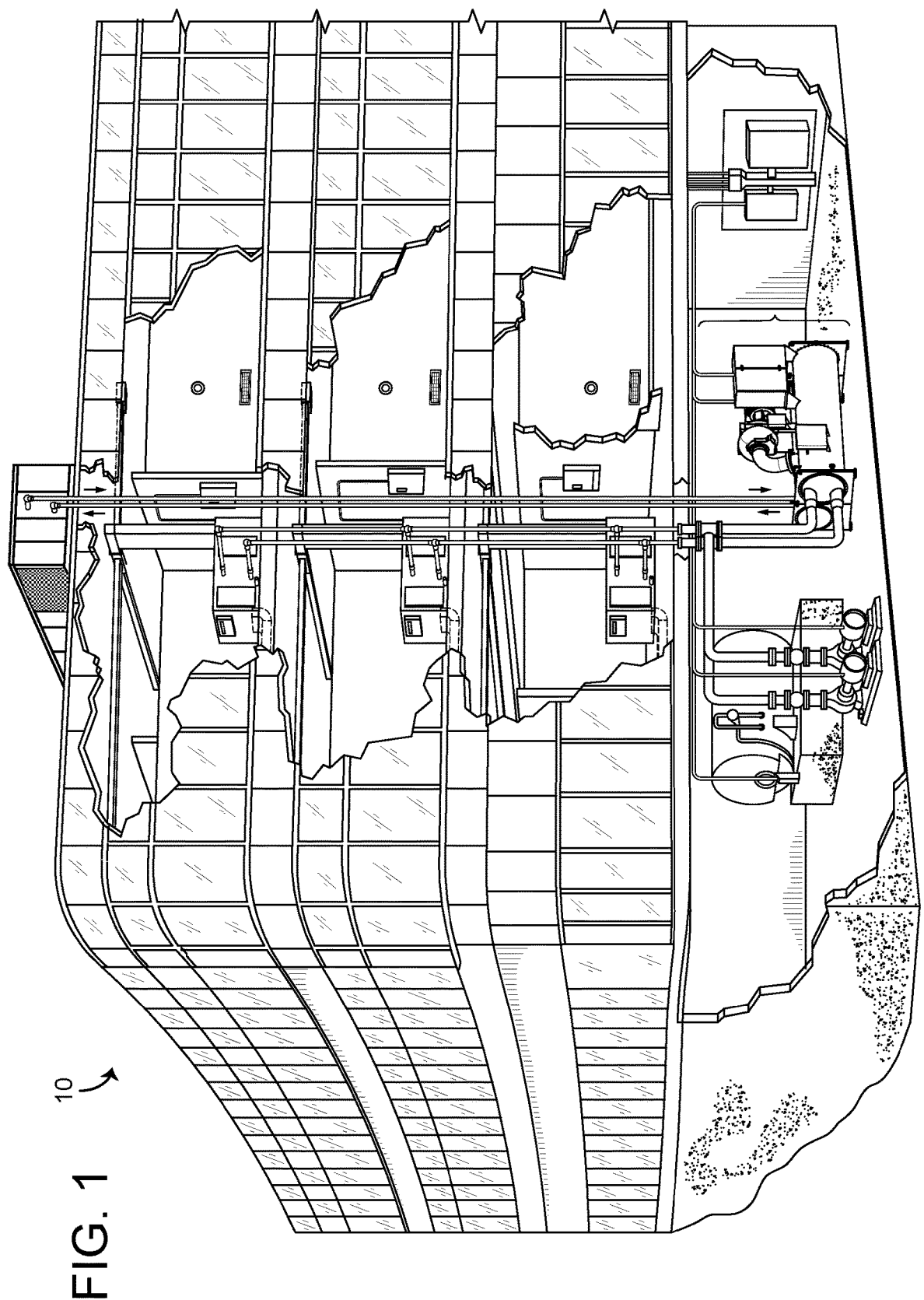
FIG. 1 is a drawing of a building equipped with a building management system (BMS), according to some embodiments.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a controller including a processing circuit, the processing circuit including one or more processors and memory, the memory storing instructions that, when executed by the one or more processors, cause the one or more processors to perform operations. The operations include determining, via a plurality of devices within a building management system (BMS), an active device. The operations further include determining a power consumption of the active device using at least one of an address of the active device or an attribute from a device object associated with the active device. The operations further include computing a total power consumption value of one or more active devices of the plurality of devices, the one or more active devices including the active device. The operations further include comparing the total power consumption value with a threshold value and, in response to determining that the total power consumption value is greater than the threshold value, arbitrating the power supplied from the bus to the active device.

In some embodiments, arbitrating the power supplied from the bus to the active device includes preventing the operation of one or more functions of the active device by reducing the power supplied from the bus to the active device.

In some embodiments, the operations include generating a token control system for the one or more active devices, the token control system including a token configured to monitor power consumption from the one or more active devices, providing the token to the active device and, in response to the active device receiving the token, permit power consumption from the active device and prevent power consumption from other active devices of the one or more active devices.

In some embodiments, the one or more processors are further configured to, in response to determining that the total power consumption value is less than the threshold value, provide a status update to an interface communicably connected to the BMS, the notification indicating that total power consumption is within an acceptable threshold.

In some embodiments, the one or more processors are further configured to, in response to determining that the total power consumption value is greater than the threshold value, reduce the total power consumption value below the threshold value by arbitrating the power supplied from the bus to the active device, providing an notification to an interface communicably connected to the BMS. In some embodiments, the notification indicates an issue has occurred in the system, the issue indicating the total power consumption value was greater than the threshold value and the issue has been resolved.

In some embodiments, the total power consumption value is determined by summing power consumption values of the one or more active devices. In some embodiments, the threshold value is one of a pre-defined value or a user defined value.

Another implementation of the present disclosure is a method for controlling power consumption in a building management system (BMS). The method includes determining, from a plurality of devices within the BMS, an active device. The method includes determining a power consumption of the active device using at least one of an address of the active device or an attribute from a device object associated with the active device. The method includes computing a total power consumption value of one or more active devices of the plurality of devices, the one or more active devices including the active device. The method includes comparing the total power consumption value with a threshold value and, in response to determining that the total power consumption value is greater than the threshold value, arbitrating the power supplied from the bus to the active device.

In some embodiments, arbitrating the power supplied from the bus to the active device includes preventing the operation of one or more functions of the active device by reducing the power supplied from the bus to the active device.

In some embodiments, the method includes generating a token control system for the one or more active devices, the token control system including a token configured to monitor power consumption from the one or more active devices, providing the token to the active device, and, in response to the active device receiving the token, permitting power consumption from the active device and prevent power consumption from other active devices of the one or more active devices.

In some embodiments, the method further includes, in response to determining that the total power consumption value is less than the threshold value, providing a status update to an interface communicably connected to the BMS, the notification indicating that total power consumption is within an acceptable threshold.

In some embodiments, the method further includes, in response to determining that the total power consumption value is greater than the threshold value, reducing the total power consumption value below the threshold value by arbitrating the power supplied from the bus to the active device, and providing an notification to an interface communicably connected to the BMS. In some embodiments, the notification indicates an issue has occurred in the system, the issue indicating the total power consumption value was greater than the threshold value and the issue has been resolved.

In some embodiments, the total power consumption value is determined by summing power consumption values of the one or more active devices. In some embodiments, the threshold value is one of a pre-defined value or a user defined value.

Another implementation of the present disclosure is a system for controlling power consumption in a building management system (BMS). The system includes a plurality of devices communicably connected within the BMS, the plurality of devices including one or more active devices, and a controller including a processing circuit. The processing circuit is configured to determine, via the plurality of devices within a building management system (BMS), the active device of the one or more active devices. The processing circuit is further configured to determine a power consumption of the active device using at least one of an address of the active device or an attribute from a device object associated with the active device. The processing circuit is further configured to compute a total power consumption value of the one or more active devices of the plurality of devices. The processing circuit is further configured to compare the total power consumption value with a threshold value, and in response to determining that the total power consumption value is greater than the threshold value, arbitrating the power supplied from the bus to the active device.

In some embodiments, arbitrating the power supplied from the bus to the active device includes preventing the operation of one or more functions of the active device by reducing the power supplied from the bus to the active device.

In some embodiments, the processing circuit is further configured to generate a token control system for the one or more active devices, the token control system including a token configured to monitor power consumption from the one or more active devices, provide the token to the active device, and in response to the active device receiving the token, permit power consumption from the active device and prevent power consumption from other active devices of the one or more active devices.

In some embodiments, the one processing circuit is further configured to, in response to determining that the total power consumption value is less than the threshold value, provide a status update to an interface communicably connected to the BMS, the notification indicating that total power consumption is within an acceptable threshold.

In some embodiments, the processing circuit is further configured to, in response to determining that the total power consumption value is greater than the threshold value, reduce the total power consumption value below the threshold value by arbitrating the power supplied from the bus to the active device and provide a notification to an interface communicably connected to the BMS. In some embodiments, the notification indicates an issue has occurred in the system, the issue indicating the total power consumption value was greater than the threshold value and the issue has been resolved. In some embodiments, the total power consumption value is determined by summing power consumption values of the one or more active devices.

DETAILED DESCRIPTION

Overview

Referring generally to THE FIGURES, systems and methods for power arbitration of devices connected to a bus is disclosed, according to some embodiments. In some embodiments, a processing circuit is connected with one or more active devices. The processing circuit can be enabled to transmit data, control power supply, and determine address of each device. The processing circuit may compute a total power consumption value by adding power consumption value of each active device. The power consumption values may be either extracted from device attributes or from a memory (e.g., a memory within the device, a memory within the controller, etc.). The processing circuit can be enabled to compare the total power consumption value with a threshold value. A token may be circulated within the active devices to draw power with a pre-defined power consumption value at pre-defined timelines. An alert (e.g., notification to the building technician, notification to a mobile device, etc.) can be generated if the total power consumption value is greater than the threshold value. The processing circuit may arbitrate the power supplied to the active devices by reducing the total power consumption below the threshold value.

Building and Building Management System

Referring now to FIG. 1, a perspective view of a building 10 is shown, according to an exemplary embodiment. A BMS serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BMS devices," "BMS device" and "building equipment" are used interchangeably throughout this disclosure.

Figure 2:
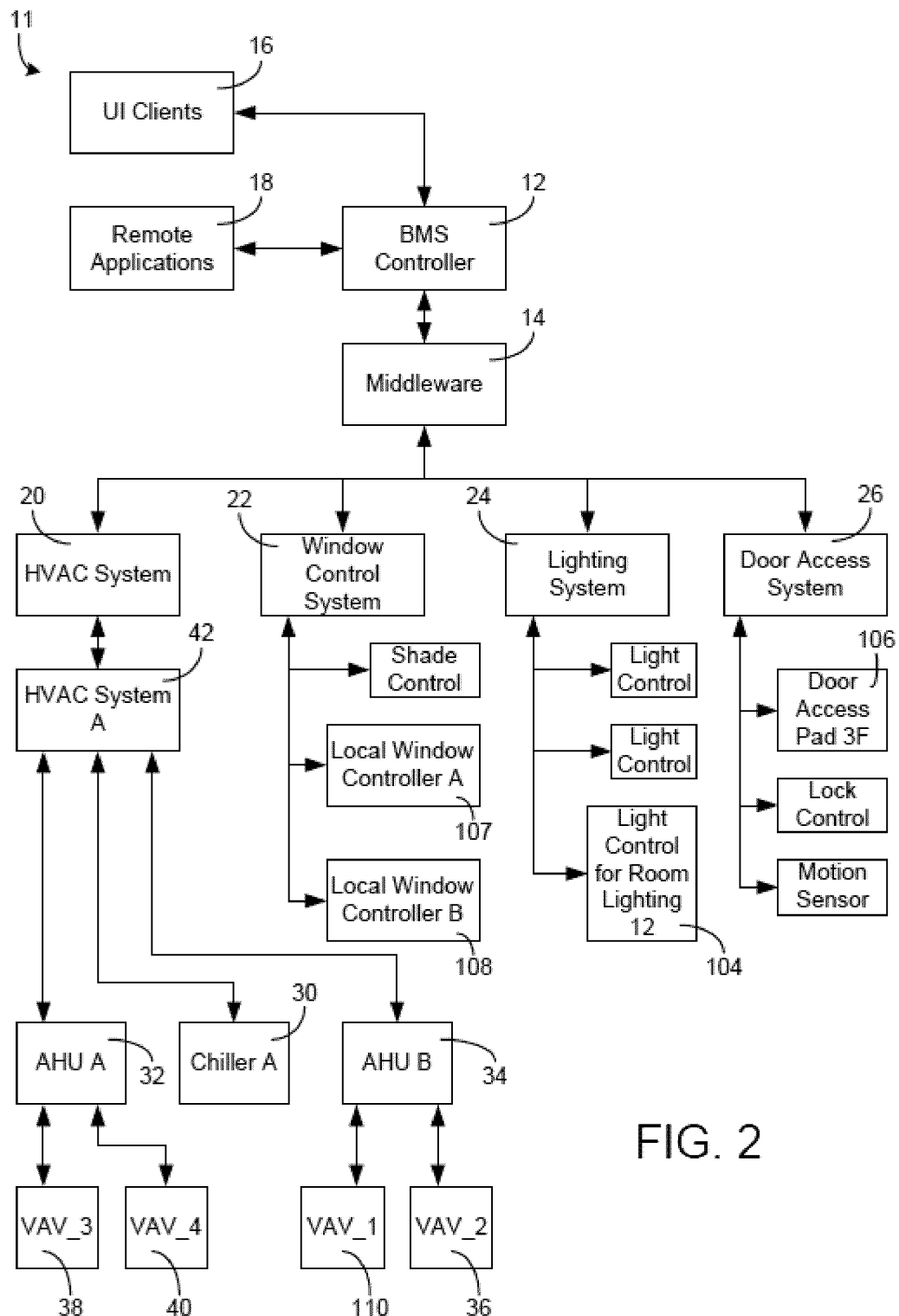
FIG. 2 is a block diagram of a BMS that serves the building of FIG. 1, according to some embodiments.

Referring now to FIG. 2, a block diagram of a BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BMS 11 may include a HVAC system 20. HVAC system 20 may control HVAC operations building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30 (named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to HVAC system 20 and on to middleware 14 and BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may integrated in some embodiments. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Figure 3:
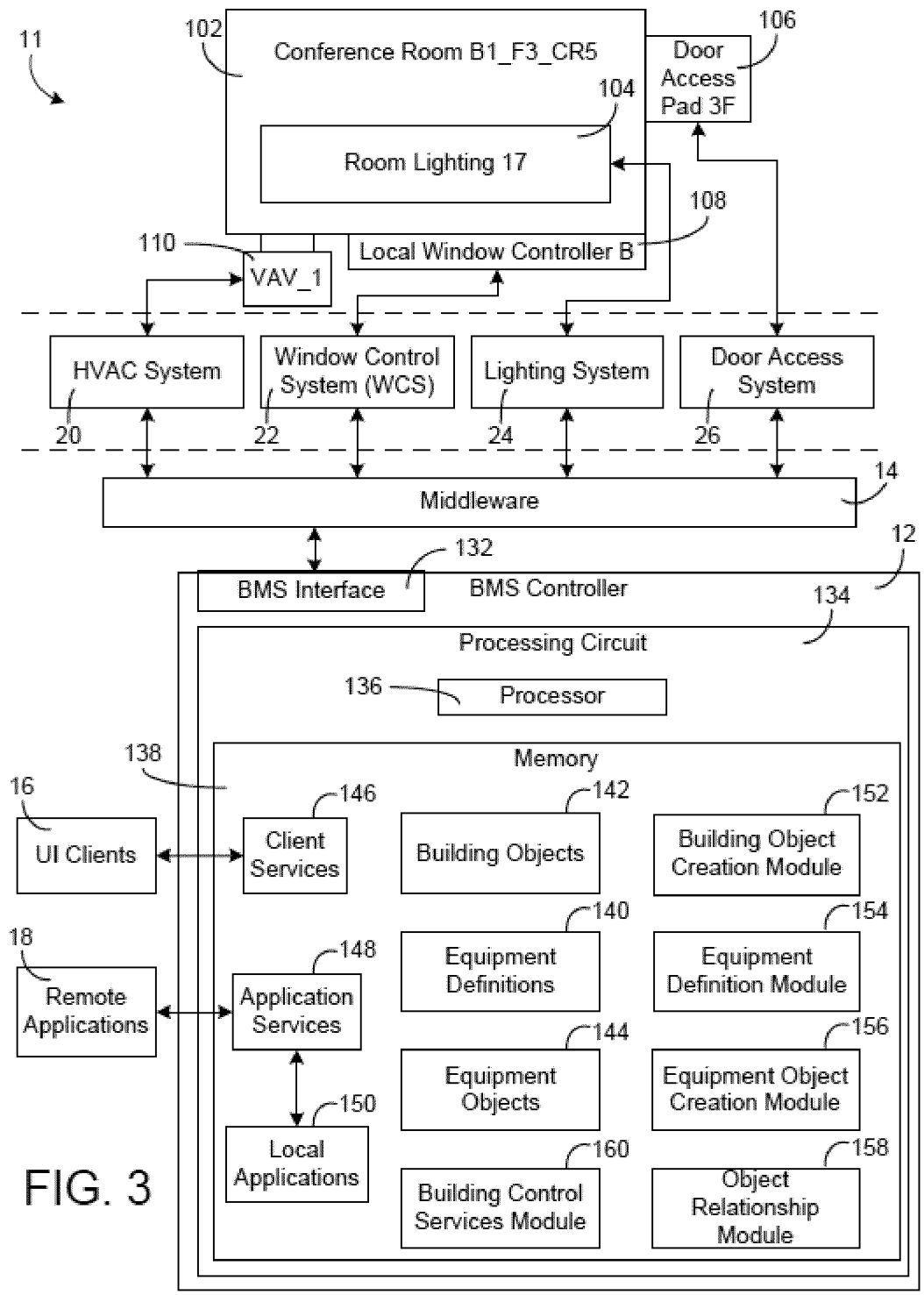
FIG. 3 is a block diagram of a BMS controller which can be used in the BMS of FIG. 2, according to some embodiments.

Referring now to FIG. 3, a block diagram illustrating a portion of BMS 11 in greater detail is shown, according to an exemplary embodiment. Particularly, FIG. 3 illustrates a portion of BMS 11 that services a conference room 102 of building 10 (named "B1_F3_CR5"). Conference room 102 may be served by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or, more generally, to the BMS subsystems 20-26. The local control circuitry of the building devices shown at the top of FIG. 3 may also be configured to receive and respond to control signals, commands, set points, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a Wi-Fi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes an application gateway configured to receive input from applications running on client devices. For example, BMS interface 132 and/or middleware 14 may include one or more wireless transceivers (e.g., a Wi-Fi transceiver, a Bluetooth transceiver, a NFC transceiver, a cellular transceiver, etc.) for communicating with client devices. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 3, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 3, memory 138 is shown to include building objects 142. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). Building objects can apply to spaces of any granularity. For example, a building object can represent an entire building, a floor of a building, or individual rooms on each floor. In some embodiments, BMS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BMS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BMS device, the search criteria specified by the point definitions can be used to automatically identify data points provided by the BMS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BMS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158.

Still referring to FIG. 3, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some embodiments, application services 148 facilitate an applications gateway for conducting electronic data communications with UI clients 16 and/or remote applications 18. For example, application services 148 may be configured to receive communications from mobile devices and/or BMS devices. Client services 146 may provide client devices with a graphical user interface that consumes data points and/or display data defined by equipment definitions 140 and mapped by equipment objects 144.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BMS devices that affect a particular building zone or room). In some embodiments, building object creation module 152 uses the systems and methods described in U.S. patent application Ser. No. 12/887,390, filed Sep. 21, 2010, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated an equipment-specific data point such as "VMA-20.DPR-POS" (i.e., the damper position of VMA-20) and/or "VMA-20.SUP-FLOW" (i.e., the supply air flow rate through VMA-20). Equipment definition module 154 abstract the equipment-specific data points to generate abstracted data point types that are generally applicable to other equipment of the same type. For example, equipment definition module 154 may abstract the equipment-specific data point "VMA-20.DPR-POS" to generate the abstracted data point type "DPR-POS" and may abstract the equipment-specific data point "VMA-20.SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some embodiments, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some embodiments, search criteria include a text string abstracted from a data point associated with the archetypal controller. For example, equipment definition module 154 may generate the abstracted text string "SUP-FLOW" from the equipment-specific data point "VMA-20.SUP-FLOW." Advantageously, the abstracted text string matches other equipment-specific data points corresponding to the supply air flow rates of other BMS devices (e.g., "VMA-18.SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some embodiments, the equipment definition created by equipment definition module 154 includes an indication of display data for BMS devices that reference the equipment definition. Display data may define one or more data points of the BMS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BMS devices. In some embodiments, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other embodiments, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various embodiments, the BMS device used to generate the equipment object may be selected automatically (e.g., by equipment object creation module 156), manually (e.g., by a user) or semi-automatically (e.g., by a user in response to an automated prompt from equipment object creation module 156).

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18.SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BMS device represented by the equipment object serves a particular space or BMS device.

Still referring to FIG. 3, memory 138 is shown to include a building control services module 160. Building control services module 160 may be configured to automatically control BMS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
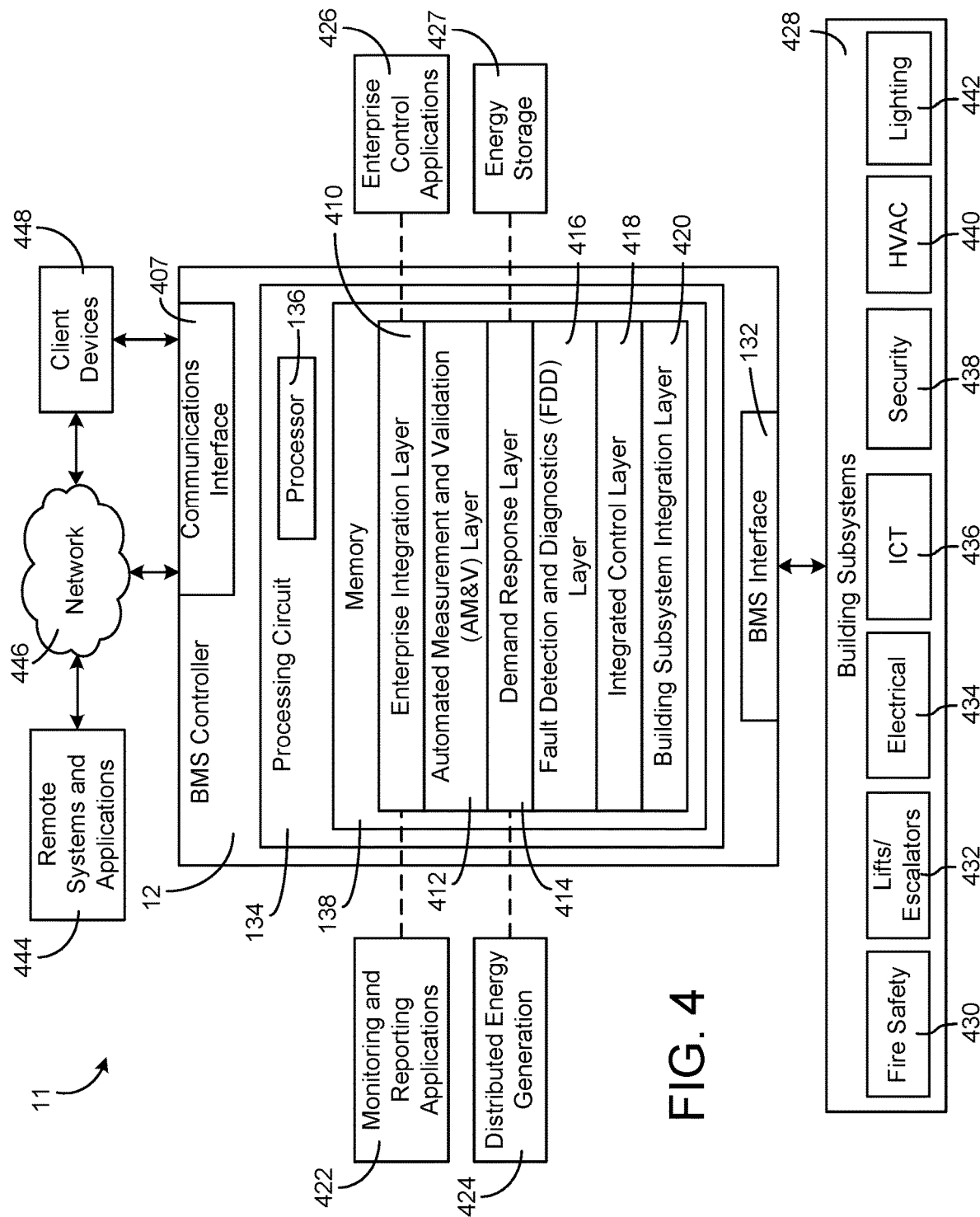
FIG. 4 is another block diagram of the BMS that serves the building of FIG. 1, according to some embodiments.

Referring now to FIG. 4, another block diagram illustrating a portion of BMS 11 in greater detail is shown, according to some embodiments. BMS 11 can be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 can include any number of devices, controllers, and connections for completing its individual functions and control activities. HVAC subsystem 440 can include many of the same components as HVAC system 20, as described with reference to FIGS. 2-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 132 can be direct (e.g., local wired or wireless communications) or via a communications network 446 (e.g., a WAN, the Internet, a cellular network, etc.). For example, interfaces 407, 132 can include an Ethernet card and port for sending and receiving data via an Ethernet-based communications link or network. In another example, interfaces 407, 132 can include a Wi-Fi transceiver for communicating via a wireless communications network. In another example, one or both of interfaces 407, 132 can include cellular or mobile phone communications transceivers. In one embodiment, communications interface 407 is a power line communications interface and BMS interface 132 is an Ethernet interface. In other embodiments, both communications interface 407 and BMS interface 132 are Ethernet interfaces or are the same Ethernet interface.

Still referring to FIG. 4, BMS controller 12 is shown to include a processing circuit 134 including a processor 136 and memory 138. Processing circuit 134 can be communicably connected to BMS interface 132 and/or communications interface 407 such that processing circuit 134 and the various components thereof can send and receive data via interfaces 407, 132. Processor 136 can be implemented as a general purpose processor, an application specific integrated circuit (ASIC), one or more field programmable gate arrays (FPGAs), a group of processing components, or other suitable electronic processing components.

Memory 138 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 138 can be or include volatile memory or non-volatile memory. Memory 138 can include database components, object code components, script components, or any other type of information structure for supporting the various activities and information structures described in the present application. According to some embodiments, memory 138 is communicably connected to processor 136 via processing circuit 134 and includes computer code for executing (e.g., by processing circuit 134 and/or processor 136) one or more processes described herein.

In some embodiments, BMS controller 12 is implemented within a single computer (e.g., one server, one housing, etc.). In various other embodiments BMS controller 12 can be distributed across multiple servers or computers (e.g., that can exist in distributed locations). Further, while FIG. 4 shows applications 422 and 426 as existing outside of BMS controller 12, in some embodiments, applications 422 and 426 can be hosted within BMS controller 12 (e.g., within memory 138).

Still referring to FIG. 4, memory 138 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 11.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 12. In yet other embodiments, enterprise control applications 426 can work with layers 410-420 to optimize building performance (e.g., efficiency, energy use, comfort, or safety) based on inputs received at interface 407 and/or BMS interface 132.

Building subsystem integration layer 420 can be configured to manage communications between BMS controller 12 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super system. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Power Arbitration of Devices Connected to a Bus

Figure 5A:
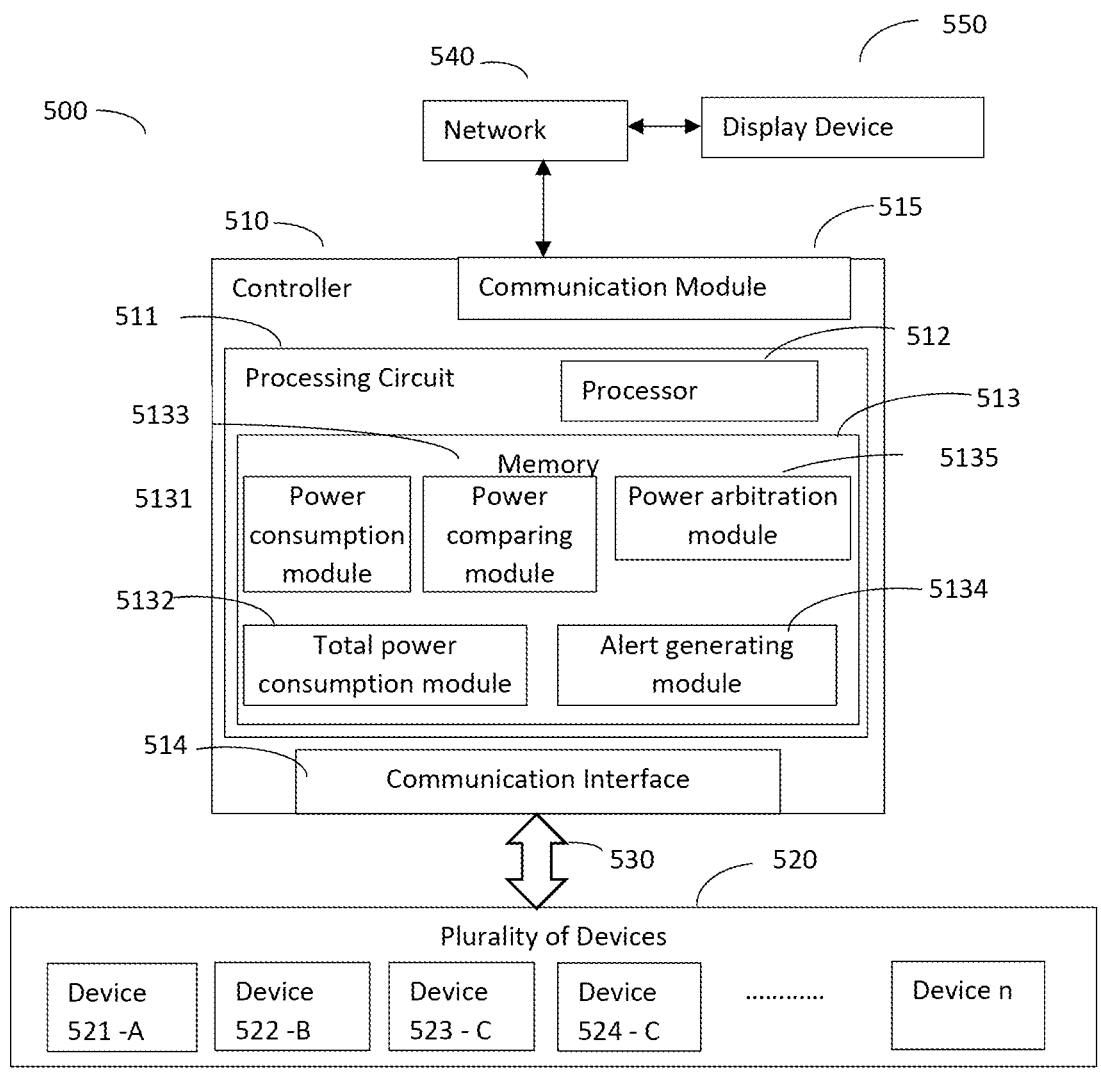
FIG. 5A is a block diagram of a system for power arbitration, according to some embodiments.

Referring now to FIG. 5A, a block diagram of a system 500 for power arbitration is illustrated, according to some embodiments. The system 500 can be implemented to automatically monitor and arbitrate the power consumption, in some embodiments. System 500 is shown to include controller 510, plurality of devices ("devices") 520, network 540, and display device 550. Controller 510 is shown to be connected to devices 520 via bus 530, as shown in FIG. 5.

Each of the plurality of devices 520 can include n number of BMS devices (e.g., device 520-A, Device 520-B, Device 520-C, Device 520-D Device n, etc.). The plurality of devices 520 may comprise, but are not limited to, electrical devices, communication and networking devices, security devices, HVAC devices, lighting devices, lifts/escalators, and fire and safety devices. In various embodiments, devices can include fewer or additional heating devices. For example, the BMS devices may comprise temperature sensors, humidity sensors, pressure sensors, blowers, curtain shutters, pumps, motors, thermostats, sub-controllers, sub-processing circuits, and the like.

The controller 510 is shown to include a processing circuit 511 having a processor 512 and a memory 513. The processing circuit 511 is communicably connected to a communication interface 514 and/or communication module 515 such that the processing circuit 511 and the various components can send and receive data via the communication interface 514 and the communication module 515. The processor 512 can be implemented as a general purpose processor, an application specific integrated circuit (ASIC), one or more field programmable gate arrays (FPGAs), a group of processing components, or other suitable electronic processing components.

The memory 513 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 513 can be or include volatile memory or non-volatile memory. The memory 513 can include database components, object code components, script components, or any other type of information structure for supporting the various activities and information structures described in the present application. According to some embodiments, the memory 513 is communicably connected to processor 512 via processing circuit 511 and includes computer code for executing (e.g., by processing circuit 511 and/or processor 512) one or more processes described herein.

The bus 530 may have shared/bundled power lines and communication lines. The controller 510 and the plurality of devices 520 are connected with the bus 530. The bus 530 may transmit power to the plurality of devices 520 and the controller 510 through one or more power lines to operate or to perform their respective functions. The bus 530 is capable of exchanging data between the plurality of devices 520 and the controller 510 through one or more communication lines. Each of the plurality of devices 520 connected to the bus 530 is provided with a unique address. In some embodiments, the unique address may correspond to an address of the bus 530. For an example, the bus 530 may be either a parallel bus or a serial bus, and can be a local bus or an external bus.

In some embodiments, the controller 510 is an upstream device and enabled for power arbitration and overriding the priority levels of the plurality of devices 520. The plurality of devices may be downstream devices. A scaling methodology may be implemented to a token as a packet. The packet may include a plurality of bytes. The packet may be added separately to allow custom values which differ from the fixed values.

The memory 513 is further shown to include a data of the plurality of devices 520, a power consumption module 5131, a total power consumption module 5132, a power comparing module 5133, an alert generating module 5134 and a power arbitration module 5135.

The data of the plurality of devices 520 may include a list of devices and a power consumption value and an address corresponding to each of the devices. In some embodiments, each device has a fixed address and a power consumption value, (e.g., pre-determined, etc.). The processing circuit 511 is enabled to access the data of one or more devices of the plurality of devices 520 from the memory 513. The one or more devices can be those devices of the plurality of devices 520 which are provided with power for operations or are simply active/online. The processing circuit 511 is enabled to communicate with the powered one or more devices via the bus 530. Hereinafter, the powered devices may be referred as active devices.

The memory 513 may further include a threshold value indicating a limiting value for total power consumption via the bus 530. The threshold value is accessed by the processing circuit 511 for arbitration of the power supplied to the active devices. In an embodiment, the threshold value can be a pre-determined threshold value or a user-defined value. The threshold value is stored primarily for dynamic power management and secondarily for the safety of the bus 530 as each bus is capable of supplying power up to a limit. The frequent oversupply of power via the bus 530 over the threshold value may reduce the life of the bus 530 or may fail to ensure reliable communications and control of the bus 530.

The device power consumption module 5131 may enable the processing circuit 511 to fetch the power consumption of each of the active devices. The power consumption of the active device may be determined either from the address of the active device or from an attribute contained within a device object sent by the active device.

A first method of the determining power consumption of the active device may be fetched from the data of the plurality of devices 520, in some embodiments. The processing circuit 511 may be enabled to detect the address of each active device and may fetch the power consumption value from the data of the plurality of devices 520 stored in the memory 513.

A second method of the power consumption of the active device may be fetched from the attribute present in the device object of the active device, in some embodiments. The attribute fetched or transmitted via the bus 530 to the processing circuit 511 may include the nominal power consumption value of the active device. The nominal power consumption value is the real time power consumption value which may defer from the power consumption value stored in the data of the plurality of devices 520 for the respective active device. The nominal power consumption value may be lesser as compared to the power consumption value stored in the data of the plurality of devices 520. If the active device is not able to generate the respective attribute then the processing circuit 511 is enabled to determine the power consumption value from the data of the plurality of devices 520 stored in the memory 513.

In an embodiment, the attribute may be fetched or transmitted via the bus 530 periodically with predefined time intervals.

The total power consumption module 5132 may enable the processing circuit 511 to compute the total power consumed by the active devices. The processing circuit 511 is enabled to add the power consumption value or the nominal consumption value (if available) of all active devices to compute the total power consumption value. The processing circuit 511 is enabled to compute the total power consumption value periodically at pre-defined time intervals.

The power comparing module 5133 may enable the processing circuit 511 to compare the total power consumption value with the threshold value stored in the memory 513. The processing circuit 511 may be enabled to determine whether the total power consumption value is below or above the threshold value. If the total power consumption value is above the threshold value then the processing circuit 511 may initiate with the alert generating module 5134 and if the total power consumption value is less than the threshold value then the processing circuit 511 may skip the processing of the alert generating module 5134 and proceed with the power arbitration module 5135.

The alert generating module 5134 may be accessed by the processing circuit 511 only when the total power consumption value is greater than the threshold value. The processing circuit 511 is enabled to generate alerts which may include one of or a combination of, but are not limited to, a display alert, a sound alert, a notification in the form of message or email and the like. The alerts may also include displaying or read-out of the value of the total power consumption which has exceeded over the limit, i.e., the difference between the total power consumption value and the threshold value. In an exemplary embodiment, when the total power consumption value is equal to or greater than the threshold value, the processing circuit 511 may be enabled to either generate an alert signal.

In some embodiments, the alert is provided for both the system 500 and for a technician or an operator who monitors the system 500. The alert signal may be transmitted to one or more alerting devices via the communication module 515 through a network 540. The system 500 may include a display device 550 as the alerting device. For example, the alert may be in the form of audio, visual, haptic, or any combination thereof.

The power arbitration module 5135 may enable the processing circuit 511 to arbitrate the power consumed by the active devices by reducing the power consumption of one or more active devices which is consumed with more power than required value. The processing circuit 511 may force the one or more active devices to turn off, disable one or more features, and/or go into sleep mode by sending a control signal. The processing circuit may arbitrate power consumed by the one or more active devices that can operate in a power saving mode. In some embodiments, when the alert signal is generated by the processing circuit 511, the power arbitration module 5135 may enable the processing circuit 511 to determine power consumption value of each of the active devices. The processing circuit 511 may send the control signal to reduce the power consumption of those active devices which have crossed the power consumption value which are pre-defined and stored in the data of the plurality of devices 520 present in the memory 513. The reduction in power consumption by one or more active devices will to bring down the total power consumption value below the threshold value. The processing circuit 511 may also refer to the device attributes received from one or more active devices for the nominal power consumption value and may compare the power consumed by the one or more active devices which are sending the device attributes. If the power consumed by the active devices is greater than the nominal power consumption value, then the processing circuit 511 may send the control signal to those active devices to reduce the power consumption to the nominal power consumption value for each device which has provided the device attribute present in the respective device object. Thus, by providing the required amount of power in the form of nominal power, the processing circuit 511 is enabled to reduce the total power consumption value and bring the total power consumption value below the threshold value. This usage of nominal power consumption value enables dynamic and real time power arbitration by the processing circuit 511 through the bus 530.

In an exemplary embodiment, when an alert is not generated, the processing circuit 511 may only refer to the nominal power consumption of the active devices which are capable of sending attributes in their respective device objects. The processing circuit 511 may send the control signal to reduce the power consumption of the active devices having the attributes to nominal power consumption value thereby reducing the total power consumption value.

In some embodiments, the control signal may comprise one or more instructions which forces the actives device to switch off, turn off, disable one or more features, or go into sleep mode which may reduce the power consumption value of each active device consuming more power which results in the reduction of total power consumption value.

The predefined time intervals for periodic monitoring of power consumption of each device, periodic computation of total power consumption, periodic comparison of total power consumption value and periodic arbitration may be fixed or variable as per the situation. In an embodiment, when an alert is generated the pre-defined time intervals may be short (e.g. 30 seconds, 60 seconds, 120 secs) and when the total power consumption is below the threshold value, the pre-defined time intervals may be long (5 mins, 10 mins, 20 mins).

In some embodiments, if priority level of a control signal is greater than or equal to priority level of BMS which may be either of a downstream device or destination device (device 520). The device 520 will act according to the control signal. The power arbitration by the controller 310 prioritization may be explained with the Table 400, which is shown below:

| Byte Index | 1 | 2 | 3 | 4 |
|---|---|---|---|---|
| Position Description | Priority Level of Message | Priority Level Device Assignment | Power Value | Power Timeout |
| Value Range (hex) | [00-FF] | [00-FF] | x4 = mA | x256 = ms |
| Example | 03 | 04 | 3C | A6 |

In some embodiments, the methodology described above may be partially or entirely implemented to a token as a packet. The packet may comprise a plurality of bytes. The packet may be added separately to allow custom values which differ from the fixed values. For example, x4=mA could be any multiplier. Furthermore, more bytes could allow for mX+b or other scaling. In some embodiments, the Priority Level Device Assignment may be executed in real time which may be implemented immediately after receiving the control signal if new priority condition is applied.

In some embodiments, a power timeout may be enabled for periodic monitoring of the power consumption which can be refreshed or configured with a new Timeout Value effective in real time.

In some embodiments, the pre-designated priority level of the device 520 may be assigned to fixed functions. A "00" function may be referred as never implement function and an "FF" function may be referred as always act function.

In some embodiments, the pre-designated power values may be assigned to fixed functions. A value of "00" is interpreted as deep sleep condition for the device 520. A value of "FF" is interpreted as an all-time full power condition regardless of the priority level device assignment. There may also be a condition where a reply may be received by a BMS device having similar structure except using the current device values rather than the commanded values from the controller.

Referring now to FIG. 5B, data 513-1 of the plurality of devices 520 is shown, according to some embodiments. The data 513-1 may comprise a list of devices connected to the bus. The data may further comprise address of each device and their respective power consumption value. FIG. 5A is shown to comprise data belonging to a list of slave devices with the naming terminology. The slave devices may comprise, but are not limited to, discharge air sensors, balancing sensors, network sensors without display, $CO_2$ sensor and the like. Each device is shown to have a power consumption value in mA (milli-amperes).

Figure 6:
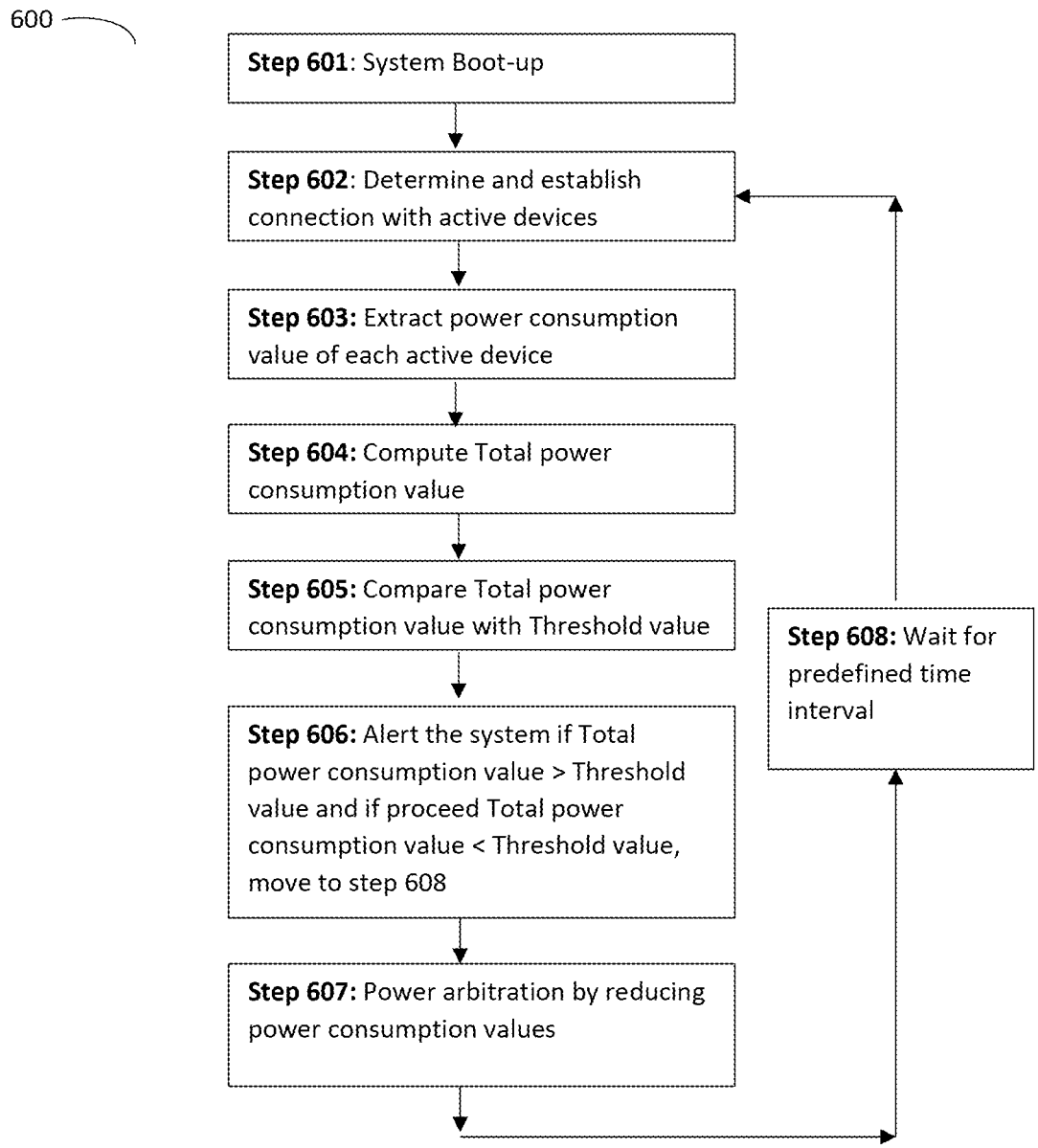
FIG. 6 is a first method of power arbitration in the system, according to some embodiments.

Referring now to FIG. 6, a first method 600 for power arbitration in a system 500 is disclosed, according to some embodiments. Method 600 can be performed partially or entirely by any of the processing components described herein, such as controller 510 described above. In some embodiments, method 600 is performed via several different processing components and is not performed entirely within a single device (e.g., controller 510, etc.).

Method 600 is shown to include performing a system boot-up (step 601). At step 601, the boot-up of the system 500 is initiated by powering the devices which are required for conducting specific functions. In some embodiments, a controller 510 along with the devices included in the controller comprising a processing circuit 511, a processor 512, a memory 513, a communication interface 514, a communication module 515 and the other devices may be powered-up. A bus 530 connects the controller 510 with a plurality of devices.

Method 600 is shown to include determining an establishing connection with active devices (step 602). At step 602, the processing circuit 511 is enabled to determine one or more active devices out of the plurality of devices 520 which can send a respective device object and establish a power connection and communication link with the active devices of the plurality of devices 520 through the bus 530. Active devices may relate to those devices which are able to send device objects to the processing circuit 511. Moreover, active devices may be required to function for a specific purpose and are able to communicate with the processing circuit 511 via the bus 530.

Method 600 is shown to include extracting one or more power consumption values of each active device (step 603). At step 603, the processing circuit 511 may determine an address of each of the active devices and determine the power consumption value of each of the active devices based on the associated address.

Method 600 is shown to include computing a total power consumption value (step 604). At step 604, the processing circuit 511 may compute the total power consumption value by adding the power consumption values of all the active devices.

Method 600 is shown to include comparing the total power consumption value with a threshold value (step 605). At step 605, the processing circuit 511 may compare the computed total power consumption value with a threshold value stored in the memory 513. The comparison enables the processing circuit 511 to determine whether the total power consumption value is less than or greater than the threshold value.

Method 600 is shown to include altering the system if the total power consumption value is greater than the threshold value or processing if the total power consumption value is less than the threshold value (step 606). At step 606, the processor 512 may be configured to conduct a decision on alerting the system 500 for overconsumption of power by the active devices through the bus 530. If the total power consumption value is less than the threshold value, then the processing circuit 511 may skip step 607 of alerting and proceeds for arbitration of the power consumed by the active devices. If the total power consumption value is greater than the threshold value then the processing circuit 511 may proceed to step 607.

Method 600 is shown to include performing power arbitration by reducing power consumption values (step 607). At step 607, processing circuit 511 may be configured to generate and send an alert via the network 540 by displaying an alert symbol or a notification message on the display device 550. In an embodiment, the alert is provided for both the system 500 and for a technician or an operator who monitors the system 500.

At step 607, when an alert is generated, the processing circuit 511 can initiate the power arbitration process by sending a control signal. The control signal may comprise one or more instructions which forces the actives device to switch off, turn off, disable one or more features, or go into sleep mode which may reduce the power consumption value of each active device consuming more power which results in the reduction of total power consumption value. The processing circuit 511 may be enabled to scan through the power line of each of the active devices and determine which of them are consuming more power than the power consumption value present in the data of the plurality of devices 520 stored in the memory 513. The processing circuit 511 through the control signal may be enabled to reduce the power consumption of those devices which were consuming more power than the power consumption values present in the data of the plurality of devices 520 stored in the memory

513. In an embodiment, processing circuit 511 may also disable one or more features of some devices or switch some active devices to sleep mode. The reduction of the power consumption, disabling of one or more features and switching the active devices to sleep mode enables the processing circuit 511 to reduce the total power consumption value below the threshold value.

Method 600 is shown to include waiting for a predefined time interval (step 608). At step 608, once the processing circuit 511 performs the power arbitration process, the processing circuit 511 may conduct method 600 from step 602 after the pre-defined time interval (e.g., 1 minute, 1 hour, 1 day, etc.). The method may turn into a cyclic process until the system 500 is deactivated or shut down.

While not presently shown in FIG. 6, the method may further include reducing the total power consumption value below the threshold value and, in response to this, providing a notification to an interface (e.g., a monitor for a building technician, a mobile device interface, etc.) indicating that the power consumption drawn from one or more of the active devices in the system were higher than necessary and/or the issue (e.g., power efficiency problem, etc.) has been resolved.

Figure 7:
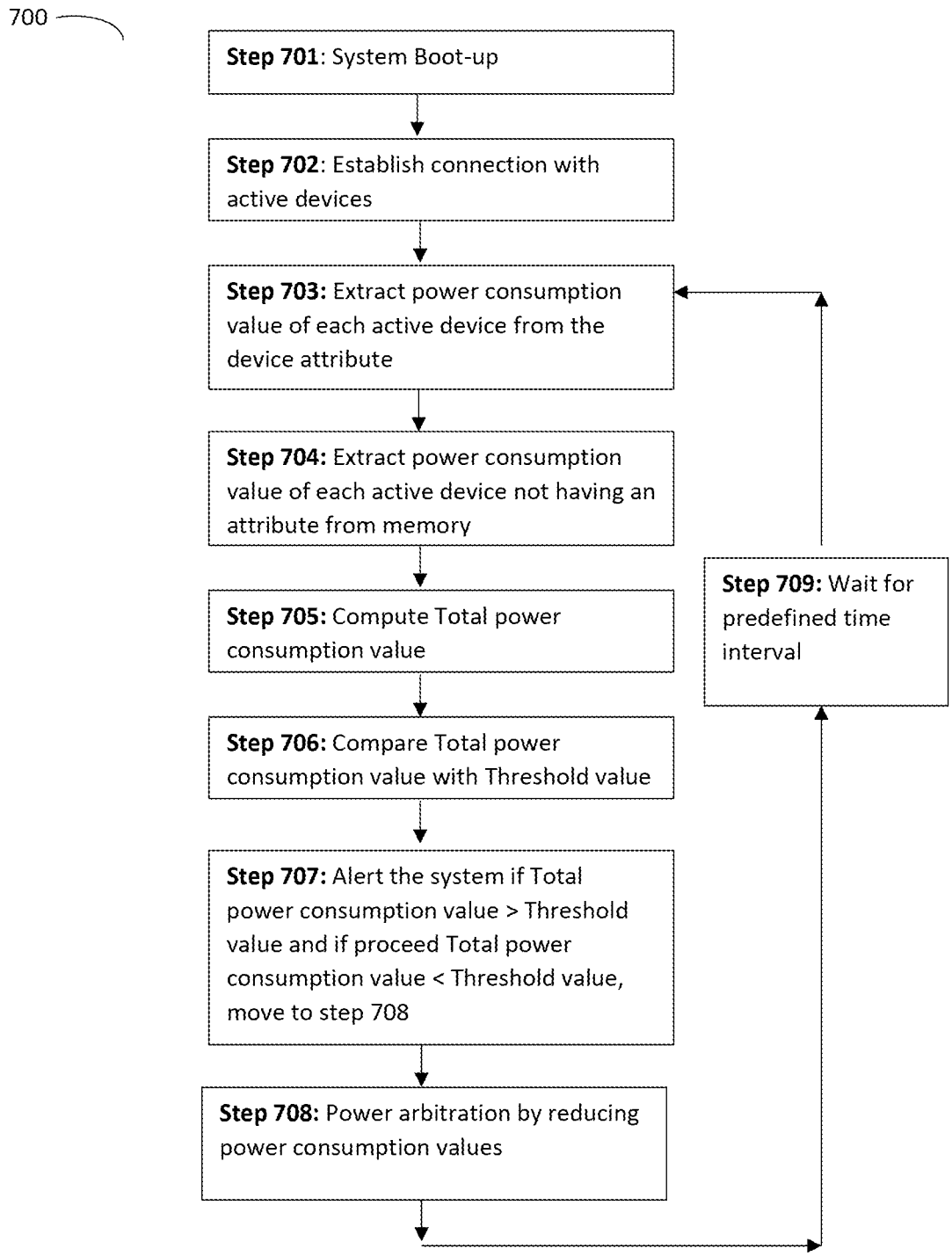
FIG. 7 is a second method of power arbitration in the system, according to some embodiments.

Referring now to FIG. 7, a second method 700 of power arbitration in the system 500 is disclosed, according to some embodiments. Method 700 can be performed partially or entirely by any of the processing components described herein, such as controller 510 described above. In some embodiments, method 700 is performed via several different processing components and is not performed entirely within a single device (e.g., controller 510, etc.).

Method 700 is shown to include performing a system boot-up (step 701). At step 701, the boot-up of the system 500 is initiated by powering the devices which are required for conducting specific functions. In an embodiment, a controller 510 along with the devices included in the controller comprising a processing circuit 511, a processor 512, a memory 513, a communication interface 514, a communication module 515 and the other devices may be powered-up. A bus 530 connects the controller 510 with a plurality of devices.

Method 700 is shown to include establishing a connection with one or more active devices (step 702). At step 702, the processing circuit 511 is enabled to determine one or more active devices out of the plurality of devices 520 which can send a respective device object and establish a power connection and communication link with the active devices of the plurality of devices 520 through the bus 530. Active devices may relate to those devices which are able to send device objects to the processing circuit 511. Moreover, active devices may be required to function for a specific purpose and are able to communicate with the processing circuit 511 via the bus 530

Method 700 is shown to include extracting power consumption value of each active device from the device attribute (step 703). At step 703, the processing circuit 511 is enabled to extract the power consumption value from the device object present in the device attribute. The current step of extraction of power consumption value is applied to those active devices which are capable of sending the device attribute in their device objects via the data line of the bus 530 and the communication interface 514.

Method 700 is shown to include extracting power consumption value(s) of each active device not having an attribute from memory (step 704). At step 704, the processing circuit 511 may determine an address of each of the active devices and determine the power consumption value of each of the active devices based on the associated address. The step 704 of determining the power consumption value associated with the address is implemented for those active device which are not able to send device attributes in their respective device objects.

Method 700 is shown to include computing total power consumption value (step 705). At step 705, the processing circuit 511 may compute the total power consumption value by adding the power consumption values of all the active devices determined at step 703 and step 704.

Method 700 is shown to include the total power consumption value with a threshold value (step 706). At step 706, the processing circuit 511 may compare the computed total power consumption value with the threshold value stored in the memory 513. The comparison enables the processing circuit 511 to determine whether the total power consumption value is less than or greater than the threshold value.

Method 700 is shown to include alerting the system if the total power consumption value is greater than the threshold value, or proceeding if the total power consumption value is less than the threshold value (step 707). At step 707, the processing circuit 511 is configured to conduct a decision on alerting the system 500 for overconsumption of power via the bus 530. If the total power consumption value is less than the threshold value, then the processing circuit 511 skips the step 708 of alerting and proceeds for arbitration of the power drawn by the active devices. If the total power consumption value is greater than the threshold value then the processor 512 proceed to step 708.

The processing circuit 511 is configured to generate and send an alert via the network 540 by displaying an alert symbol or a notification message on the display device 550. In an embodiment, the alert is provided for both the system 500 and for a technician or an operator who monitors the system 500.

Method 700 is shown to include performing power arbitration by reducing power consumption values (step 708). At step 708, when an alert is generated, the processing circuit 511 initiates the power arbitration process. The processing circuit 511 may send a control signal to the one or more active devices for reduction of power consumption. The control signal may comprise one or more instructions which forces the actives device to switch off, turn off, disable one or more features, or go into sleep mode which may reduce the power consumption value of each active device consuming more power which results in the reduction of total power consumption value. The processing circuit 511 is enabled to scan through the power line of each of the active devices which have provided the device attributes and determine which of them are consuming more power than the nominal power consumption values. The processing circuit 511 is further enabled to scan through the power line of each of the active devices which have not provided the device attributes and determine which of them are consuming more power than the power consumption value present in the data of the plurality of devices 520 stored in the memory 513. The processing circuit 511 is enabled to reduce the power consumption of those devices which were consuming higher power values than the nominal power consumption values. The processing circuit 511 is further enabled to reduce the power consumption of those devices which were consuming higher power values than the power consumption values present in the data of the plurality of devices 520 stored in the memory 513. In an embodiment, processing circuit 511 may also disable one or more features of some device or switch some active devices to sleep mode. The reduction of the power consumption, disabling of one or more features and switching the active devices to sleep mode enables the processing circuit 511 to reduce the total power consumption value below the threshold value.

Method 700 is shown to include waiting for predefined time intervals (step 709). At step 709, once the processing circuit 511 performs the power arbitration process, the processing circuit 511 conducts the method from step 703 after the pre-defined time interval. The method may turn into a cyclic process until the system 500 is shut down.

Thus, both the first method 600 and the second method 700 provide real time and dynamic power management by power arbitration process.

Figure 8:
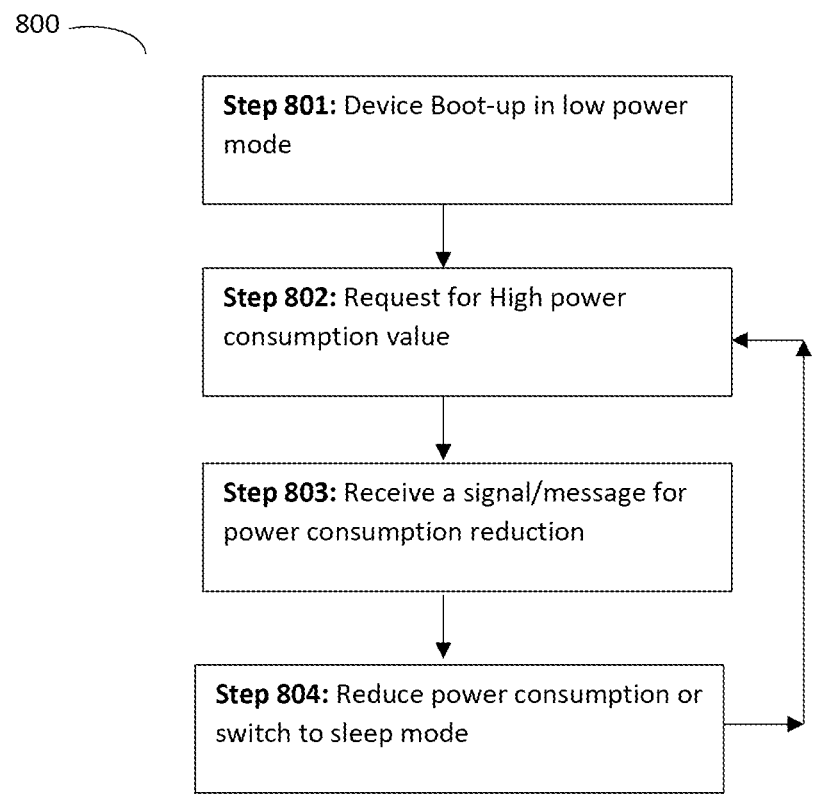
FIG. 8 is a method of power arbitration of the active device, according to some embodiments.

Referring now to FIG. 8, a method 800 of power arbitration of an active device is disclosed, according to some embodiments. The method 800 is described from a device perspective. Method 800 can be performed partially or entirely by any of the processing components described herein, such as controller 510 described above. In some embodiments, method 800 is performed via several different processing components and is not performed entirely within a single device (e.g., controller 510, etc.).

Method 800 is shown to include performing a boot-up of a device in low power mode (step 801). At step 801, the active device may start up in a low power mode with only those features which are required to keep the active device in an active state.

Method 800 is shown to include requesting for a high consumption value (step 802). At step 802, the active device may request a processing circuit 511 for high power consumption for enabling the functioning of other features to complete a specific task/function at a specific instance or time. There will be a time when the device still consumes the high power even after the required function/task is completed by the active device.

Method 800 is shown to include receiving a signal/message for power consumption reduction (step 803). At step 803, when an alert signal is generated by the processing circuit 511, the active device may receive control signal from the processing circuit 511 to reduce the power consumption because the total power consumption value at the system 500 level is greater than the threshold value.

Method 800 is shown to include reducing power consumption or switching to sleep mode (step 804). At step 804, the active device disables the features which are not required and only keeps those features of the active device to remain in active state. In an embodiment, the active device may also switch to a sleep mode.

The device may again request for high power as disclosed in step 802 when there is a requirement the functioning of other features to complete the specific task/function In an example, to describe the method 800, a backlight control of an interactive LCD or an LED screen can be started with a low power mode where only limited part/amount of backlight may be powered. When the screen receives a touch of a human, then the screen may request the backlight control for high power to turn the whole screen into a bright mode. When the person interacting with the screen has completed with the interaction, the backlight is still kept in a bright mode. The backlight control may command the backlight to go back in low power mode on receiving an alert from a main control unit.

In some embodiments, to control and keep the power consumption of one or more devices 520 in the system within the threshold value. An electronic token system may be used which enables one or more devices to access power from the power source for their functioning. By implementation of the token system, only those devices provided with the token will be allowed to draw power to perform their respective functions. A token is passed between devices and a device would only draw power when it has the token. When the function of the device is completed, the token is then passed to other devices. In some embodiments, the token can be generated or received by any of the processing components described herein, such as controller 510.

In some embodiments, one or more active devices, from the one or more devices 520, are enabled to draw power for 24 hours a day. Each active device is enabled by the token to draw a specific amount of power from the bus. The specific amount may correspond to a specific power consumption value. The token further enables the active device to draw power for a specific timeline above or below a default level. In an embodiment, the token is enabled to switch an active device to sleep mode for a specific timeline. For example, device 520-D, being an active device, and having the token, is enabled to draw 24 mA from 10 a.m. to 2 p.m. The token further enables to switch the device to sleep mode from 2 p.m. to 6 p.m. Device 520-D is enabled to draw 16 mA from 6 p.m. to 1 a.m. At other timelines, device 520-D may be switched off or remain inactive.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A controller comprising a processing circuit comprising one or more processors and memory, the memory storing instructions that, when executed by the one or more processors, cause the one or more processors to perform operations comprising:
    determining, via a plurality of devices within a building management system (BMS), an active device;
    determining a power consumption of the active device using at least one of an address of the active device or an attribute from a device object associated with the active device by:
        determining if the attribute includes a real-time power consumption value;
        in response to determining that the attribute includes the real-time power consumption value, associating the power consumption of the active device with the real-time power consumption value;
        in response to determining that the real-time power consumption value is missing from the attribute, associating the power consumption of the active device with a stored power consumption value;
    computing a total power consumption value of one or more active devices of the plurality of devices, the one or more active devices comprising the active device;
    comparing the total power consumption value with a threshold value; and
    in response to determining that the total power consumption value is greater than the threshold value, arbitrating power supplied from a bus to the active device by:

generating a token control system for the one or more active devices, the token control system comprising a token configured to monitor the power consumption from the active device;

providing the token to the active device; and in response to the active device receiving the token, permitting the power consumption from the active device and preventing the power consumption from other active devices of the one or more active devices.

2. The controller of claim 1, wherein arbitrating the power supplied from the bus to the active device comprises preventing operation of one or more functions of the active device by reducing the power supplied from the bus to the active device.

3. The controller of claim 1, wherein the one or more processors are further configured to, in response to determining that the total power consumption value is less than the threshold value, provide a status update to an interface communicably connected to the BMS, the status update indicating that total power consumption is within an acceptable threshold.

4. The controller of claim 1, wherein the one or more processors are further configured to:

in response to determining that the total power consumption value is greater than the threshold value, reduce the total power consumption value below the threshold value by arbitrating the power supplied from the bus to the active device; and provide a notification to an interface communicably connected to the BMS, the notification indicating:
an issue has occurred in the BMS, the issue indicating the total power consumption value was greater than the threshold value; and
the issue has been resolved.

5. The controller of claim 1, wherein the total power consumption value is determined by summing power consumption values of the one or more active devices.

6. The controller of claim 1, wherein the threshold value is one of a pre-defined value or a user defined value.

7. A method for controlling power consumption in a building management system (BMS), the method comprising:

determining, from a plurality of devices within the BMS, an active device;

determining a power consumption of the active device using at least one of an address of the active device or an attribute from a device object associated with the active device by:
determining if the attribute includes a real-time power consumption value;
in response to determining that the attribute includes the real-time power consumption value, associating the power consumption of the active device with the real-time power consumption value;
in response to determining that the real-time power consumption value is missing from the attribute, associating the power consumption of the active device with a stored power consumption value;

computing a total power consumption value of one or more active devices of the plurality of devices, the one or more active devices comprising the active device;

comparing the total power consumption value with a threshold value; and in response to determining that the total power consumption value is greater than the threshold value, arbitrating power supplied from a bus to the active device by:

generating a token control system for the one or more active devices, the token control system comprising a token configured to monitor the power consumption from the one or more active devices;

providing the token to the active device; and in response to the active device receiving the token, permitting the power consumption from the active device and prevent power consumption from other active devices of the one or more active devices.

8. The method of claim 7, wherein arbitrating the power supplied from the bus to the active device comprises preventing operation of one or more functions of the active device by reducing the power supplied from the bus to the active device.

9. The method of claim 7, wherein the method further comprises, in response to determining that the total power consumption value is less than the threshold value, providing a status update to an interface communicably connected to the BMS, the status update indicating that total power consumption is within an acceptable threshold.

10. The method of claim 7, wherein the method further comprises:

in response to determining that the total power consumption value is greater than the threshold value, reducing the total power consumption value below the threshold value by arbitrating the power supplied from the bus to the active device; and providing a notification to an interface communicably connected to the BMS, the notification indicating:
an issue has occurred in the BMS, the issue indicating the total power consumption value was greater than the threshold value; and
the issue has been resolved.

11. The method of claim 7, wherein the total power consumption value is determined by summing power consumption values of the one or more active devices.

12. The method of claim 7, wherein the threshold value is one of a pre-defined value or a user defined value.

13. A system for controlling power consumption in a building management system (BMS), the system comprising;

a plurality of devices communicably connected within the BMS, the plurality of devices comprising one or more active devices; and a controller comprising a processing circuit configured to:
determine a power consumption of the one or more active devices by:
determining which of the one or more active devices include an attribute from a device object with a real-time power consumption value;
setting the power consumption for the one or more active devices with the attribute in the device object to the real-time power consumption value;
setting the power consumption for the one or more active devices without the attribute in the device object to a stored power consumption value;
compute a total power consumption value of the one or more active devices based on the real-time power consumption value and the stored power consumption value;
compare the total power consumption value with a threshold value; and
in response to determining that the total power consumption value is greater than the threshold value, arbitrate the power supplied from a bus to an active device of the one or more active devices by:

identifying each of the one or more active devices with the power consumption above the stored power consumption value; and reducing the power consumption of each of the one or more active devices with the power consumption above the stored power consumption value to at or below the stored power consumption value.

14. The system of claim 13, wherein arbitrating power supplied from the bus to the active device further comprises preventing operation of one or more functions of the active device by reducing the power supplied from the bus to the active device.

15. The system of claim 13, wherein the processing circuit is further configured to:
generate a token control system for the one or more active devices, the token control system comprising a token configured to monitor power consumption from the one or more active devices;
provide the token to the active device; and
in response to the active device receiving the token, permit power consumption from the active device and prevent power consumption from other active devices of the one or more active devices.

16. The system of claim 13, wherein the processing circuit is further configured to, in response to determining that the total power consumption value is less than the threshold value, provide a status update to an interface communicably connected to the BMS, the status update indicating that total power consumption is within an acceptable threshold.

17. The system of claim 13, wherein the processing circuit is further configured to:
in response to determining that the total power consumption value is greater than the threshold value, reduce the total power consumption value below the threshold value by arbitrating the power supplied from the bus to the active device; and
providing a notification to an interface communicably connected to the BMS, the notification indicating:
an issue has occurred in the system, the issue indicating the total power consumption value was greater than the threshold value; and
the issue has been resolved.

18. The system of claim 13, wherein the total power consumption value is determined by summing power consumption values of the one or more active devices.

* * * * *